US007370204B2

(12) United States Patent
Kawano

(10) Patent No.: US 7,370,204 B2
(45) Date of Patent: May 6, 2008

(54) WATERMARK DATA EMBEDDING APPARATUS AND EXTRACTING APPARATUS

(75) Inventor: Yasuhiro Kawano, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 780 days.

(21) Appl. No.: 10/364,484

(22) Filed: Feb. 11, 2003

(65) Prior Publication Data

US 2003/0154379 A1 Aug. 14, 2003

(30) Foreign Application Priority Data

Feb. 12, 2002 (JP) ............................ 2002-034456

(51) Int. Cl.
*H04L 9/00* (2006.01)

(52) U.S. Cl. ...................... 713/176; 713/179; 713/180; 380/236; 380/237; 382/207; 382/270; 382/273

(58) Field of Classification Search ................ 713/176, 713/179, 180; 380/236, 237; 382/207, 270, 382/273
See application file for complete search history.

(56) References Cited

U.S. PATENT DOCUMENTS

| | | | | |
|---|---|---|---|---|
| 5,889,868 | A * | 3/1999 | Moskowitz et al. | 713/176 |
| 5,930,369 | A * | 7/1999 | Cox et al. | 380/54 |
| 6,169,241 | B1 * | 1/2001 | Shimizu | 84/605 |
| 6,209,096 | B1 | 3/2001 | Taruguchi | |
| 6,359,573 | B1 | 3/2002 | Taruguchi et al. | |
| 6,952,774 | B1 * | 10/2005 | Kirovski et al. | 713/176 |
| 2001/0046298 | A1 | 11/2001 | Terada et al. | |
| 2004/0030900 | A1 * | 2/2004 | Clark | 713/176 |

FOREIGN PATENT DOCUMENTS

| | | |
|---|---|---|
| JP | 2000-242286 | 9/2000 |

* cited by examiner

*Primary Examiner*—Kim Vu
*Assistant Examiner*—Beemnet W Dada
(74) *Attorney, Agent, or Firm*—Morrison & Foerster LLP

(57) ABSTRACT

By a program process, CPU 31 embeds a watermark data into a waveform data stored in wave memory 41*a*. The program includes a step for detecting a characterizing part (attack part and loop part) of a waveform data that represents a waveform of a musical tone where the characterizing part represents characteristics of the musical tone, and a step for embedding a watermark data into a part of the waveform data excluding the detected characterizing part. Further, CPU 31 can also extract the watermark data by a program process including a step for detecting the characterizing part and a step for extracting the watermark data embedded in a part excluding the detected characterizing part. Thus, from waveform data including a watermark data, natural musical tones can be reproduced without deteriorating the characteristics of the musical tones at the time of reproduction.

6 Claims, 4 Drawing Sheets

WATERMARK DATA EMBEDDING APPARATUS AND EXTRACTING APPARATUS

BACKGROUND OF THE INVENTION

1. Field of the Invention

The present invention relates to a watermark data embedding apparatus and a watermark data embedding program for embedding a watermark data into a waveform data that represents a waveform of a musical tone, as well as a watermark data extracting apparatus and a watermark data extracting program for extracting the watermark data embedded in the waveform data.

2. Description of the Background Art

Hitherto, it is known in the art to embed a watermark data such as identification information into a waveform data that represents a waveform of a musical tone in order to find out an illegal copy of the waveform data. In such a conventional embedment of a watermark data, an attack part representing the characteristics of the musical tone is detected to embed the watermark data into the attack part.

Embedment of a watermark data into a waveform data means change of the contents of the waveform data. When the watermark data is embedded into the attack part most conspicuously representing the characteristics of the musical tone as in the aforementioned prior art technique, the data contents of the attack part are changed, thereby disadvantageously deteriorating the characteristics of the musical tone that is reproduced on the basis of the waveform data.

SUMMARY OF THE INVENTION

The present invention has been made in order to solve the aforementioned problems of the prior art, and an object thereof is to provide a watermark data embedding apparatus and a watermark data embedding program for embedding a watermark data into a waveform data without deteriorating the characteristics of the musical tones to be reproduced. Further, another object of the present invention is to provide a watermark data extracting apparatus and a watermark data extracting program for extracting the watermark data embedded in the aforementioned manner from the waveform data.

In order to achieve the aforementioned objects of the present invention, a characteristic feature of the present invention lies in detecting a characterizing part of a waveform data that represents a waveform of a musical tone where the characterizing part represents the characteristics of the musical tone, and embedding a watermark data into a part of the waveform data excluding the detected characterizing part. In this case, the waveform data is composed of an attack part, a loop part, and other parts (for example, a part between the attack part and the loop part). The attack part means a part where the musical tone rise, and the loop part is a part that is repeatedly read out and reproduced at the time of reproduction of the musical tone. Among these, the characterizing part in the present invention means the attack part and the loop part. Further, as a watermark data, one can adopt, for example, identification information such as a series of letters or a logo mark representing a creator, a creating juridical person, or the like that has created the waveform data.

According to the present invention having such a feature, the watermark data is embedded into a part of the waveform data excluding the characterizing part representing the characteristics of the musical tone (for example, into the part between the attack part and the loop part), thereby preventing deterioration of the characterizing part of the musical tone that is to be reproduced. As a result of this, when this waveform data is reproduced, natural musical tones having conspicuous characteristics can be reproduced.

Further, another characteristic feature of the present invention lies in detecting a characterizing part of a waveform data that represents a waveform of a musical tone where the characterizing part represents the characteristics of the musical tone, and extracting a watermark data embedded in a part of the waveform data excluding the detected characterizing part. According to this feature, the embedded watermark data can be extracted and, when identification data is adopted as the watermark data, one can easily find out an illegal copy of the waveform data.

In addition, in embedding the watermark data, among a plurality of sampling data each representing a sampling value of the musical tone waveform and constituting the waveform data, the watermark data may preferably be embedded only into the sampling data that represent sampling values exceeding or being equal to a predetermined value. This can avoid embedment of the watermark data into sampling data that represent small sampling values of the musical tone waveform and are hence liable to be affected by errors caused by the embedment of the watermark data. As a result of this, the musical tone reproduced from the waveform data can be prevented from being largely changed from the original musical tone. Further, in this case, in extraction of the watermark data as well, the watermark may preferably be extracted only from the sampling data that represent sampling values exceeding or being equal to a predetermined value.

DESCRIPTION OF THE PREFERRED EMBODIMENTS

Figure 1:
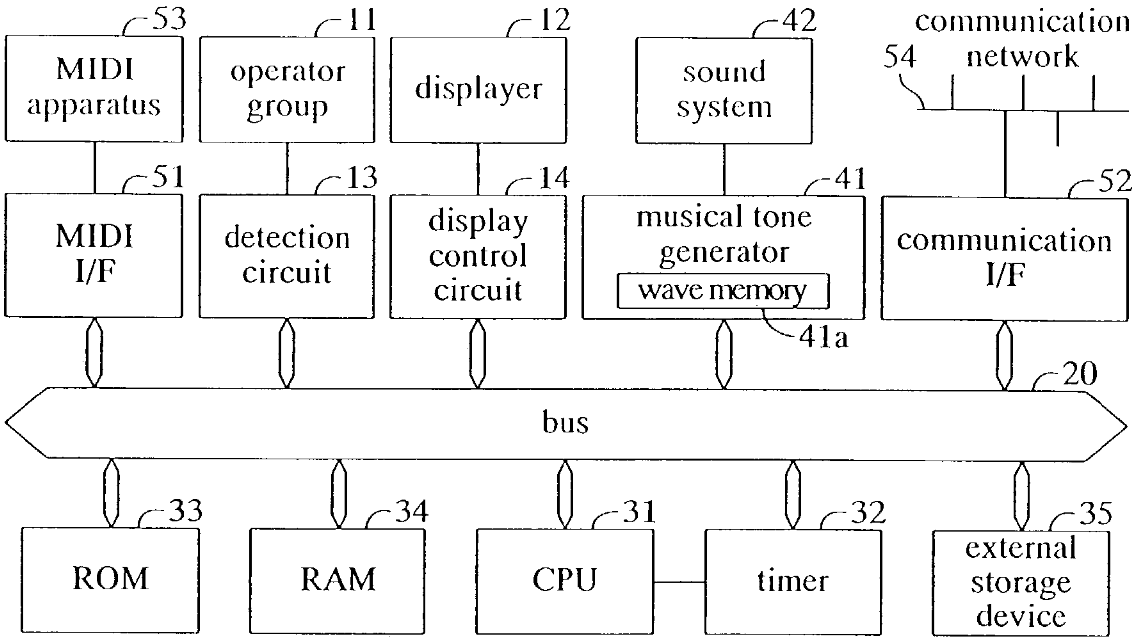
FIG. 1 is a block diagram of an electronic apparatus to which the present invention is applied.

Hereafter, one embodiment of the present invention will be described with reference to the attached drawings. FIG. 1 is a block diagram illustrating an electronic apparatus to which the apparatus and the program of the present invention are applied. The electronic apparatus may be, for example, one of various apparatus including electronic musical instruments, sequencers, personal computers, and others.

This electronic apparatus includes an operator group 11 and a displayer 12. Operator group 11 is disposed on an operation panel and is operated by a user for giving instructions on various operations of this electronic apparatus. The operation of each operator in this operator group 11 is detected by on/off of an operator switch disposed in correspondence with each operator in a detection circuit 13 connected to a bus 20. Displayer 12 is disposed on the operation panel or independently from the operation panel, and is constituted with a liquid crystal display, a cathode ray tube device, or the like for displaying letters, symbols, figures, and others. The display mode of this displayer 12 is controlled by a display control circuit 14 connected to bus 20.

A CPU 31, a timer 32, a ROM 33, a RAM 34, an external storage device 35, and a a musical tone generator 41 are connected to bus 20. CPU 31, timer 32, ROM 33, and RAM 34 constitute a main body part of a microcomputer, and control various operations of this electronic apparatus by execution of a computer program. External storage device 35 is made of an external recording medium such as a hard disk HD incorporated in advance in this electronic apparatus, or a flexible disk FD or a compact disk CD that is mountable on and detachable from this electronic apparatus. Further, this external storage device 35 also includes a drive unit for writing and reading data/programs in the aforesaid external recording medium. In particular, in this embodiment, the watermark data embedding program of FIG. 3 and the watermark data extracting program of FIG. 4 are stored in an external recording medium such as the hard disk HD, flexible disk FD, or compact disk CD.

Under control of CPU 31, a musical tone generator 41 generates (i.e. reproduces) musical tone signals with the use of the waveform data stored in a built-in wave memory 41*a*. The generated musical tone signals are supplied to a sound system 42. Sound system 42 is made of amplifiers, speakers, or the like and sounds out musical tones corresponding to the aforesaid supplied musical tone signals.

Figure 2:
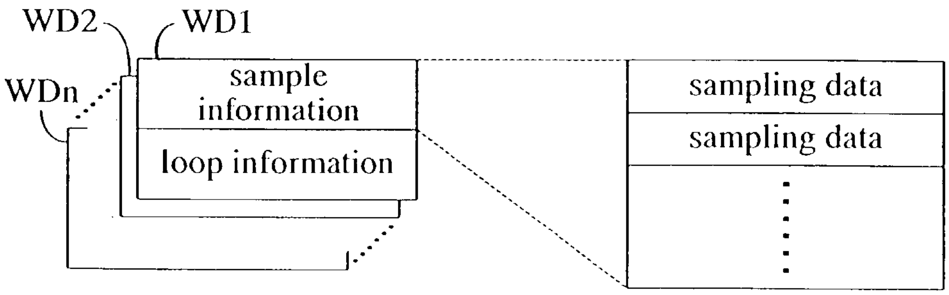
FIG. 2 is a data format of waveform data.
Figure 5:
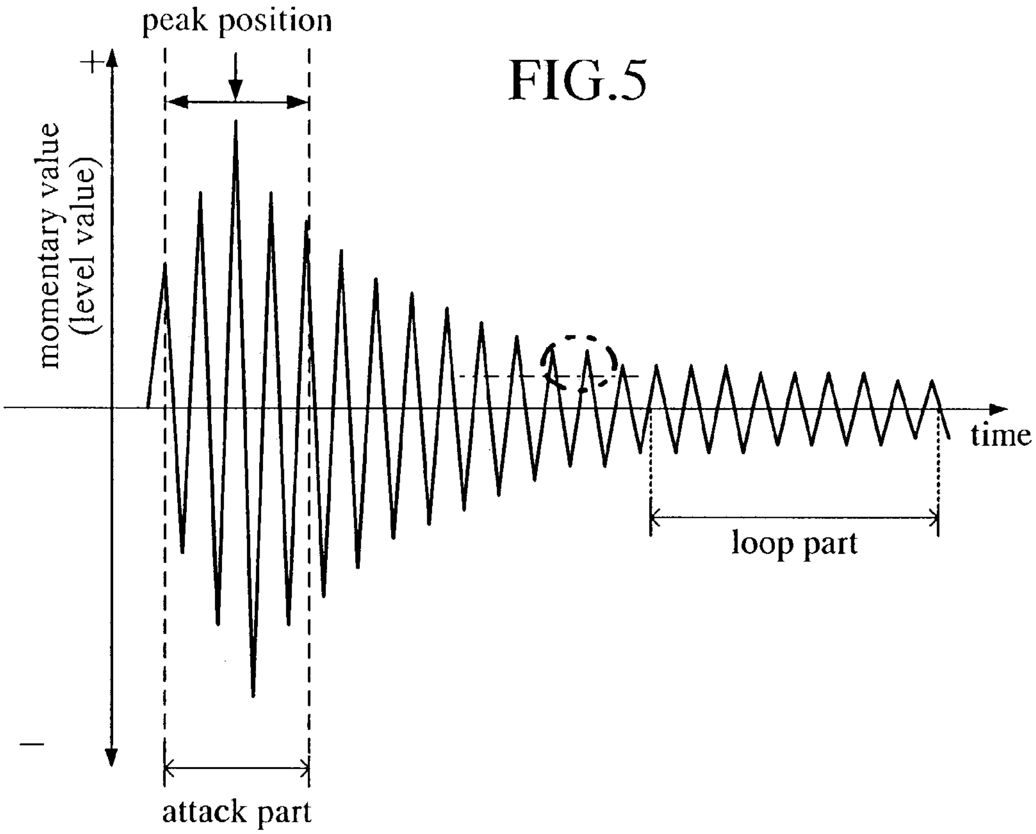
FIG. 5 is a view illustrating a musical tone waveform represented by waveform data.

Referring to FIG. 2, wave memory 41*a* stores a plurality of waveform data WD1, WD2, . . . WDn. Each waveform data is made of sample information and loop information. The sample information is formed by sampling a musical tone waveform, such as shown in FIG. 5, at a predetermined rate, and is made of a plurality of sampling data representing a series of sampling values (i.e. level values) of the musical tone waveform. Here, this sample information does not include all of the plurality of sampling data from the start till the end of the musical tone to be generated, but a part of the sampling data at the end portion of the musical tone to be generated is omitted. The loop information is made of a starting position (i.e. starting address) and an ending position (i.e. ending address) of the loop part (see FIG. 5) of the sampling data that is repeatedly used at the time of reproducing the sampling data.

Further, a MIDI interface circuit 51 and a communication interface circuit 52 are connected to bus 20. MIDI interface circuit 51 exchanges MIDI data to and from a MIDI apparatus 53 connected to MIDI interface circuit 51. Here, MIDI apparatus 53 is a general comprehensive term for various electronic apparatus conforming to the MIDI standard, such as other electronic apparatus and personal computers. Communication interface circuit 52 is connectable to outside via a communication network 54, and allows exchange of various programs and data between this electronic apparatus and outside.

Next, the operation of the embodiment constructed as shown above will be described. A user lets CPU 31 execute the watermark data embedding program stored in an external recording medium of external storage device 35. In execution of this program, the watermark data embedding program stored in the aforesaid external recording medium is transferred to RAM 34, and CPU 31 executes this watermark data embedding program transferred to RAM 34. Here, in the event that this watermark data embedding program is not recorded in the aforesaid external recording medium, the watermark data embedding program may be downloaded from MIDI apparatus 53 via MIDI interface circuit 51, or alternatively the watermark data embedding program may be downloaded from outside via communication interface circuit 52 and communication network 54 so that CPU 31 can execute the downloaded watermark data embedding program. Still alternatively, the watermark data embedding program may be stored in advance in ROM 33 so that CPU 31 can execute the watermark data embedding program.

Figure 3:
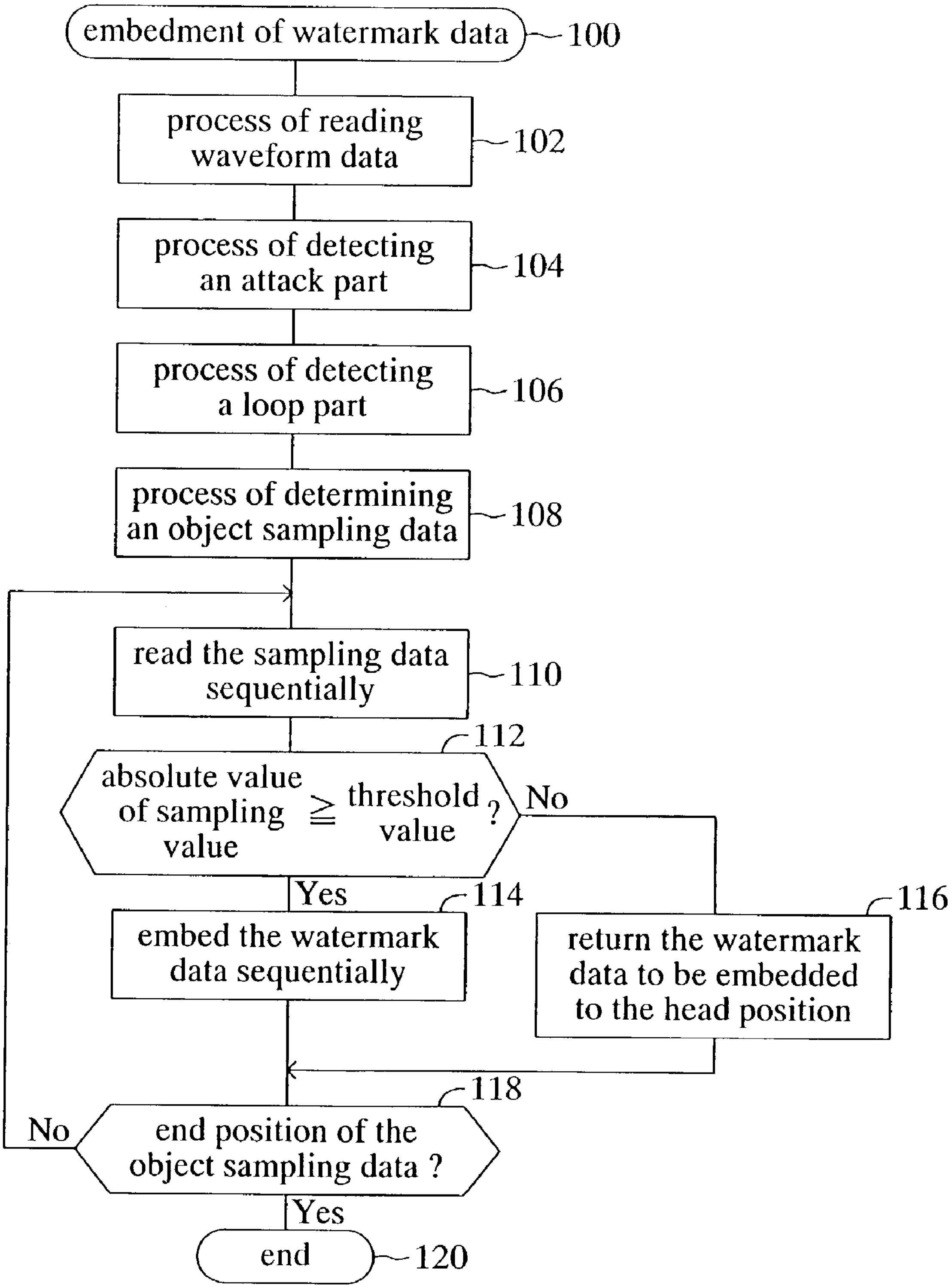
FIG. 3 is a flowchart of a watermark embedding program executed by the CPU of FIG. 1.
Figure 4:
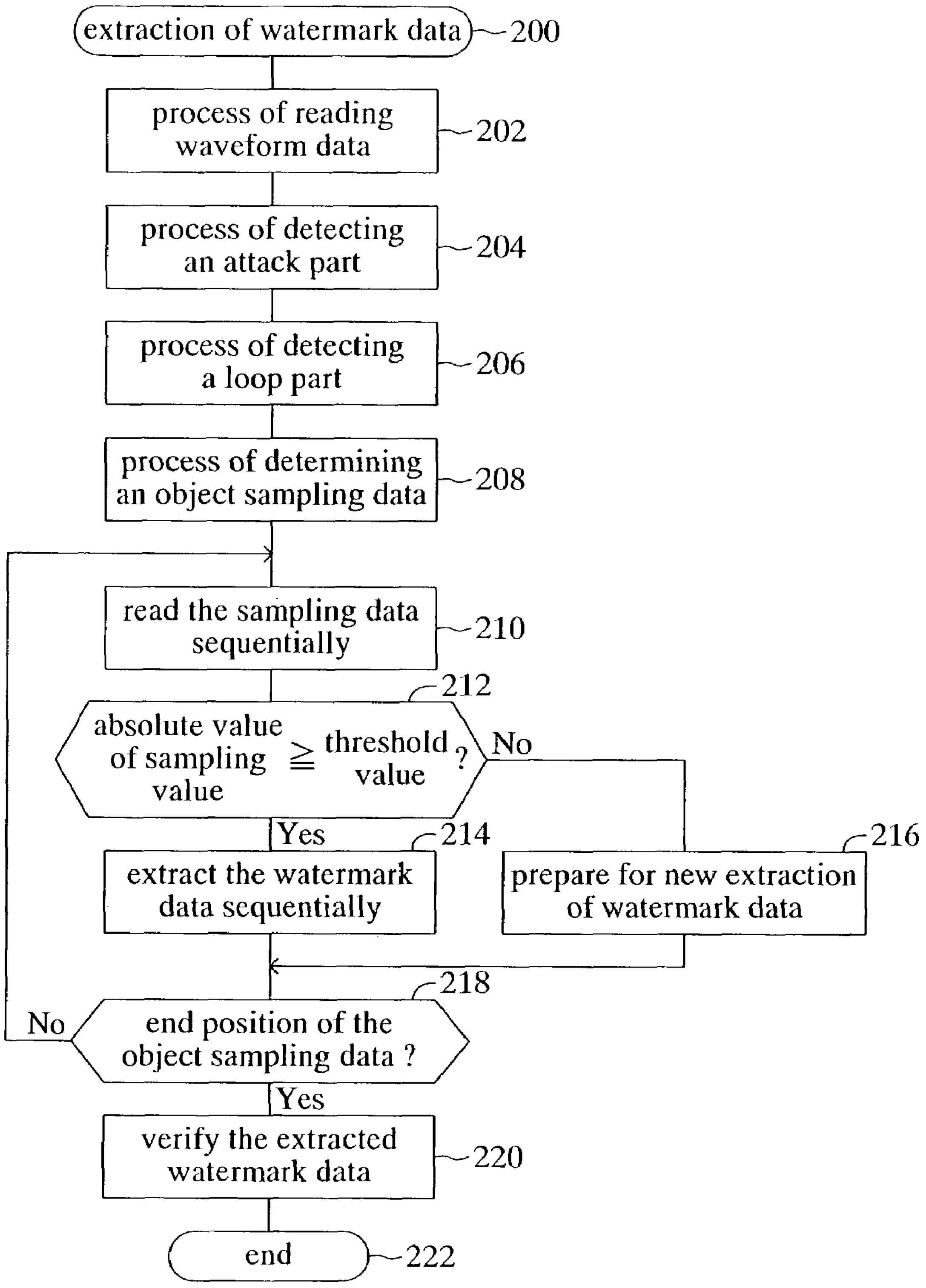
FIG. 4 is a flowchart of a watermark extracting program executed by the CPU of FIG. 1.

The execution of this watermark data embedding program is started at step 100 of FIG. 3, and CPU 31 at step 102 executes a process of reading out the waveform data into which the watermark data is to be embedded. In this process of reading out the waveform data, the user lets displayer 12 display the types, titles, and others of the plurality of waveform data WD1, WD2, . . . WDn stored in wave memory 41*a* by operation of operator group 11, so as to select one waveform data from among the plural waveform data. CPU 31 reads out the selected waveform data (sample information and loop information) from wave memory 41*a* and stores the waveform data into RAM 34.

Subsequently, CPU 31 at step 104 executes a process of detecting the attack part. In this process of detecting the attack part, first, CPU 31 sequentially reads out each sampling data of the aforesaid waveform data stored in RAM 34 starting from the head thereof, so as to detect the peak position of the waveform data. In this case, the peak position is the position at which the absolute value of the sampling value (level value) represented by each sampling data attains its maximum, as shown in FIG. 5. After detection of this peak position, intervals of a predetermined width before and after the peak position, including the peak position at the center, are regarded as the attack part. This predetermined width may be determined in advance; however, the width may be a length from the head position of the musical tone waveform to the peak position of the musical tone waveform. In this case, the attack part is equal to the sum of the interval from the head position to the peak position of the musical tone waveform and the interval extending forward from the peak position and having a width equal to the length from the head position to the peak position.

After the aforesaid process of step 104, CPU 31 at step 106 executes a process of detecting the loop part. In this process of detecting the loop part, CPU 31 reads out the loop information of the aforesaid waveform data stored in RAM 34, whereby an interval designated by the read-out loop information is determined as the loop interval. After this process of step 106, CPU 31 at step 108 executes a process of determining an object sampling data. In this process of determining the object sampling data, the aforesaid detected attack part and loop part are excluded from all the sampling data constituting the aforesaid waveform data stored in RAM 34, and the obtained residual sampling data are determined as the object sampling data. As a result of this, the object sampling data will be the sampling data contained in the sampling data of the waveform data and sandwiched between the attack part and the loop part.

Subsequently, CPU 31 executes a circulation process composed of steps 110 to 118 to embed the watermark data into the object sampling data until the end position of the object sampling data is determined by the process of step 118, i.e. until the final object sampling data is read out. In this embodiment, this watermark data is made of, for example, identification information such as a series of letters or a logo mark representing a creator, a creating juridical person, or the like that has created the waveform data. In this embodiment, as a specific example, a series of letters "XYZ123" is adopted as the identification information (watermark data) for use in the following description.

In step 110, for each circulation process made of steps 110 to 118, CPU 31 sequentially reads out the aforesaid object sampling data stored in RAM 34 one by one from the head position to the end position. Then, CPU 31 at step 112 determines whether or not the absolute value of the sampling value (level value) represented by the aforesaid read-out sampling data exceeds or is equal to a predetermined threshold value.

If the absolute value of the sampling value exceeds or is equal to the predetermined threshold value, CPU 31 at step 112 determines as "YES" and proceeds to step 114. In step 114, the least significant bits of the sampling data are sequentially changed into a bit pattern representing the watermark data bit by bit. Specifically, with regard to the series of letters "XYZ123", a serial data of "Y" obtained by converting the plural bits representing the letter "Y" into a serial data made of bits is joined to a serial data of "X" obtained by converting the plural bits representing the letter "X" into a serial data made of bits, and then serial data of "Z", "1", "2", and "3" are likewise sequentially joined. In other words, the series of letters "XYZ123" are converted into serial data one byte by one byte, and joined in the order of "X", "Y", . . . , "3" in advance for preparation. Then, the least significant bit of each of the aforesaid read-out sampling data is sequentially replaced with this prepared serial data bit by bit.

On the other hand, if the absolute value of the sampling value (level value) represented by the aforesaid read-out sampling data is below the predetermined threshold value, CPU 31 at step 112 determines as "NO" and proceeds to step 116. In step 116, the watermark data to be embedded into the waveform data is returned to the head position. Specifically, this means that, among the aforesaid previously prepared serial data made of bits and representing the series of letters "XYZ123", the bit position of the serial data to be embedded into the next sampling data is set at the head bit.

Figure 6:
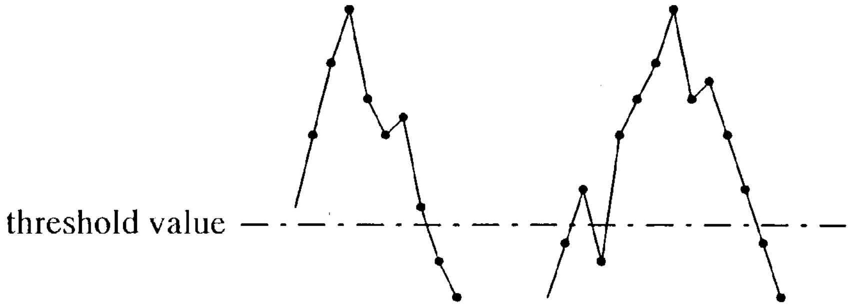
FIG. 6 is an enlarged view of the part surrounded by a two-dot chain line in FIG. 5.

Referring to FIG. 6, by such a repetition process made of steps 110 to 116, if the absolute value of the sampling value represented by the sampling data exceeds or is equal to the threshold value, the least significant bit of each sampling data is sequentially replaced with the serial data of the series of letters "XYZ123". Then, if the absolute value of the sampling value represented by the sampling data continues to be above or equal to the threshold value for a long period of time, a complete set of the series of letters "XYZ123" will be written into the object sampling data. If this state continues further, the series of letters "XYZ123" begins to be written into the object sampling data again from the head. On the other hand, if the absolute value of the sampling value represented by the sampling data does not continue to be above or equal to the threshold value for a long period of time, an incomplete set of the watermark data such as a series of letters "XYZ" or "X" will be written into the object sampling data repeatedly from the head.

When the final data of the object sampling data has been read out, CPU 31 at step 118 determines as "YES" and ends the execution of this watermark data embedding program in step 120. As a result of this, the complete watermark data and parts of the watermark data are repeatedly written into the object sampling data in the end. Specifically, if the watermark data is made of a series of letters "XYZ123", watermark data made of a repetition of all and parts of the series of letters, for example, "XYZ123", "XYZ123", "X", "XYZ123", "XYZ", "X", "X", . . . , are written in the object sampling data.

The waveform data into which the watermark data has been written in this manner is returned to wave memory 41*a*, or else stored into an external recording medium of external storage device 35. Alternatively, the waveform data is transferred to MIDI apparatus 53 via MIDI interface circuit 51, or else is output to outside via communication interface circuit 52 and communication network 54.

As will be understood from the above description, according to the above-described embodiment, the watermark data (identification information) is embedded into a part of the waveform data excluding the attack part and the loop part, i.e. into the part sandwiched between the attack part and the loop part. In this case, since the attack part and the loop part of the waveform data constitute a characterizing part that characterizes the musical tone, the watermark data (identification information) is written into the part excluding the characterizing part that characterizes the musical tone, thereby preventing deterioration of the characterizing part of the musical tone to be reproduced. Therefore, when this waveform data is reproduced, natural musical tones having conspicuous characteristics are reproduced.

In addition, according to the above-described embodiment, among a plurality of sampling data excluding the aforementioned characterizing part, the watermark data is embedded only into the sampling data that represent sampling values exceeding or being equal to a predetermined value. This can avoid embedment of the watermark data into sampling data that represent small sampling values of the musical tone waveform and are hence liable to be affected by errors caused by the embedment of the watermark data. As a result of this, the musical tone reproduced from the waveform data can be prevented from being largely changed from the original musical tone.

Next, an operation of extracting the watermark data embedded into the waveform data in the aforementioned manner will be described. In this case, the user lets CPU 31 execute the watermark data extracting program stored in an external recording medium of external storage device 35 in the same manner as in the aforementioned case of the watermark data embedding program. Further, also in this case, in the event that this watermark data extracting program is not recorded in the aforementioned external recording medium, the watermark data extracting program may be downloaded from MIDI apparatus 53 or from outside via communication network 54. Alternatively, the watermark data extracting program stored in advance in ROM 33 may be used.

The execution of this watermark data extracting program is started at step 200 of FIG. 4. By a process of step 202 similar to the process of step 102 in the above-described watermark data embedding program, the waveform data (sample information and loop information) from which the watermark data is to be extracted is read out from wave memory 41*a* and stored into RAM 34. Subsequently, by processes of steps 204 to 208 similar to the processes of steps 104 to 108 in the above-described watermark data embedding program, the attack part and the loop part (the characterizing parts) are excluded from all the sampling data constituting the aforesaid waveform data stored in RAM 34, and the obtained residual sampling data are determined as the object sampling data.

Subsequently, CPU 31 executes a circulation process composed of steps 210 to 218 to extract the watermark data in the object sampling data until the end position of the object sampling data is determined by the process of step 218 similar to the determining process of step 118 in the above-described watermark data embedding program. The process of comparing the absolute value of the sampling value and the threshold value in step 212 is the same as the comparing process of step 112 in the above-described watermark data embedding program.

If the absolute value of the sampling value (level value) represented by the sampling data read out from the object sampling data exceeds or is equal to a predetermined threshold value, CPU 31 at step 212 determines as "YES" and proceeds to step 214. In step 214, the least significant bit of the sampling data is extracted, so as to form a serial data of bits that are coupled bit by bit from the head as a bit pattern representing a watermark data. On the other hand, if the absolute value of the sampling value (level value) represented by the aforesaid read-out sampling data is below the predetermined threshold value, CPU 31 at step 212 determines as "NO" and proceeds to step 216. In step 216, new extraction of the watermark data is prepared. Namely, CPU 31 makes preparations so that the data made of one bit and extracted in the next process of step 214 will be the head of a new serial bit pattern. Further, the serial data formed by coupling the previously extracted bits is treated as one bit pattern.

When the absolute value of the sampling value represented by the sampling data continues to be above or equal to the threshold value for a long period of time by such processes of steps 210 to 218, a long serial data is formed. This long serial data contains, for example, a bit pattern representing the complete series of letters "XYZ123". On the other hand, if the absolute value of the sampling value represented by the sampling data does not continue to be above or equal to the threshold value for a long period of time, only a short serial data is formed. This short serial data contains, for example, a bit pattern made of an incomplete series of letters such as "XYZ" or "X".

When the final data of the object sampling data has been read out, CPU 31 at step 218 determines as "YES" and proceeds to step 220. In step 220, information (for example, a series of letters) represented by the watermark data is reproduced on the basis of plural sets of serial data made of long serial data and short serial data such as described above. More specifically, a serial data is sequentially cut out from the head of each serial data for each predetermined number of bits (corresponding to the length of one byte), and is converted into a parallel data. By this process, if the watermark data is "XYZ123", data representing a series of letters such as "XYZ123", "XYZ123", "X", "XYZ123", "XYZ", "X", "X", . . . is extracted. Therefore, by comparing these with each other, a data corresponding to the largest series of letters can be extracted as a watermark data.

After the aforesaid process of step 220, CPU 31 ends the execution of this watermark data extracting program at step 222.

As will be understood from the above-description, the watermark data (identification information) embedded into the waveform data by execution of the aforesaid watermark data embedding program is extracted, whereby an illegal copy of the waveform data can be easily found out.

Here, in the above-described embodiment, the attack part of the musical tone waveform is detected on the basis of the peak position. Alternatively, however, attack information made of a starting address and an ending address indicating the attack part may be included in the waveform data, whereby the attack part may be detected on the basis of this attack information. Further, with regard to the loop part, instead of using the detection method of the above-described embodiment, one may extract a predetermined width from the end point of the waveform data as a loop part.

In addition, an alternative method can be adopted as a method of embedding a watermark data. Instead of embedding the watermark data into the least significant bit of each sampling data as in the above-described embodiment, one may embed the watermark data into any one bit or plural bits of a plurality of bits on the least significant side (for example, two or three bits from the least significant side) of each sampling data. Further, instead of simply embedding the watermark data, one may embed the watermark data using the spectrum diffusion method.

Further, in the above-described embodiment, wave memory 41*a* stores waveform data made of sampling data directly representing the sampling values (level values) of the musical tone waveform; however, instead of the sampling data, various compressed data may be stored in wave memory 41*a*. For example, a plurality of difference data representing the differences between adjacent sampling points of the musical tone waveform may be stored into wave memory 41*a* instead of the aforesaid sampling data.

Further, in the above-described embodiment, the processes of embedding and extracting the watermark data are applied to the waveform data stored in wave memory 41*a* of a musical tone generator 41; however, the aforesaid processes of embedding and extracting the watermark data may be applied to a waveform data stored in ROM 33 or in an external recording medium of external storage device 35. Alternatively, a waveform data stored in MIDI apparatus 53 may be taken in into RAM 34 via MIDI interface circuit 51 so that the aforesaid processes of embedding and extracting the watermark data may be applied to the aforesaid waveform data that has been taken in. Still alternatively, a waveform data may be taken in into RAM 34 from outside via communication network 54 and communication interface circuit 52 so that the aforesaid processes of embedding and extracting the watermark data may be applied to the aforesaid waveform data that has been taken in.

Further, in carrying out the present invention, it is not limited to the above-described embodiments or modifications thereof, so that various modifications can be made as long as they do not depart from the object of the present invention.

What is claimed is:

1. A watermark data embedding apparatus comprising:

generating means for generating a musical tone;

characterizing part detecting means for detecting an attack part and a loop part of a waveform data that represents a waveform of a musical tone, said attack part and loop part representing characteristics of the musical tone; and watermark data embedding means for embedding a watermark data into a part of the waveform data excluding said detected attack part and loop part, wherein the waveform data is constituted of a plurality of sampling data each representing a sampling value of the waveform; and said watermark data embedding means embeds the watermark data into the sampling data that represent sampling values exceeding or being equal to a predetermined value.

2. A watermark data embedding apparatus according to claim 1, wherein said characterizing part detection means detects a peak position of the waveform data to detect a predetermined width part including the detected peak position at the center as said attack portion.

3. A watermark data embedding apparatus according to claim 1, wherein the waveform data include loop information indicating a loop part; and said characterizing part detecting means reads out the loop information to detect a part indicated by the loop information as said loop part.

4. A watermark data extracting apparatus comprising:

generating means for generating a musical tone;

characterizing part detecting means for detecting an attack part and a loop part of a waveform data that represents a waveform of a musical tone, said attack part and loop part representing characteristics of the musical tone; and watermark data extracting means for extracting a watermark data embedded in a part of the waveform data excluding said detected attack part and loop part, wherein the waveform data is constituted of a plurality of sampling data each representing a sampling value of the waveform; and said watermark data is embedded within the sampling data that represent sampling values exceeding or being equal to a predetermined value.

5. A computer-readable medium having stored therein a program, for causing a computer to execute a method of embedding a watermark data into a waveform data, said method comprising:

a characterizing part detecting step for detecting an attack part and a loop part of the waveform data that represents a waveform of a musical tone, said attack part and loop part representing characteristics of the musical tone; and a watermark data embedding step for embedding a watermark data into a part of the waveform data excluding said detected attack part and loop part, wherein the waveform data is constituted of a plurality of sampling data each representing a sampling value of the waveform; and said watermark data embedding step embeds the watermark data into the sampling data that represent sampling values exceeding or being equal to a predetermined value.

6. A computer-readable medium having stored therein a program, for causing a computer to execute a method of extracting a watermark data from a waveform data, said method comprising:

a characterizing part detecting step for detecting an attack part and a loop part of the waveform data that represents a waveform of a musical tone, said attach part and loop part representing characteristics of the musical tone; and a watermark data extracting step for extracting a watermark data embedded in a part of the waveform data excluding said detected attack part and loop part, wherein the waveform data is constituted of a plurality of sampling data each representing a sampling value of the waveform; and said watermark data is embedded within the sampling data that represent sampling values exceeding or being equal to a predetermined value.

* * * * *